United States Patent
Guerrero et al.

(10) Patent No.: US 10,855,745 B2
(45) Date of Patent: Dec. 1, 2020

(54) SYSTEMS AND METHODS FOR DOWNLOADING DATA CHUNKS USING A VARYING NUMBER OF SIMULTANEOUS CONNECTIONS

(71) Applicant: DELL PRODUCTS L.P., Round Rock, TX (US)

(72) Inventors: Fernando L. Guerrero, Austin, TX (US); Danilo O. Tan, Austin, TX (US); Juan M. Martinez, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 65 days.

(21) Appl. No.: 16/204,532

(22) Filed: Nov. 29, 2018

(65) Prior Publication Data
US 2020/0177668 A1 Jun. 4, 2020

(51) Int. Cl.
*H04L 29/08* (2006.01)
*H04L 29/06* (2006.01)
*G06F 11/14* (2006.01)
*G06F 16/13* (2019.01)
*G06F 16/182* (2019.01)

(52) U.S. Cl.
CPC .......... *H04L 67/06* (2013.01); *G06F 11/1441* (2013.01); *G06F 16/137* (2019.01); *G06F 16/1824* (2019.01); *H04L 67/10* (2013.01); *H04L 67/1085* (2013.01); *H04L 67/34* (2013.01); *H04L 69/14* (2013.01)

(58) Field of Classification Search
CPC .............................. H04L 67/06; H04L 67/10
See application file for complete search history.

(56) References Cited

U.S. PATENT DOCUMENTS

| | | | | |
|---|---|---|---|---|
| 6,061,733 A * | 5/2000 | Bodin | ..................... | H04L 29/06 709/203 |
| 6,199,107 B1 * | 3/2001 | Dujari | ................. | G06F 16/9574 709/219 |
| 6,377,974 B1 * | 4/2002 | Feigenbaum | ........... | H04L 29/06 709/203 |
| 6,477,373 B1 * | 11/2002 | Rappaport | ........ | H04W 36/0079 455/436 |
| 7,441,041 B2 * | 10/2008 | Williams | ................ | H04L 67/34 709/232 |
| 7,477,152 B2 * | 1/2009 | Forster | ............... | G01R 31/3025 340/572.1 |

(Continued)

OTHER PUBLICATIONS

Wikipedia, "Chunk (information)", Printed from Internet Nov. 15, 2018, 1 pg.

(Continued)

*Primary Examiner* — Lashonda T Jacobs
(74) *Attorney, Agent, or Firm* — Egan Peterman Enders Huston

(57) ABSTRACT

Systems and methods are provided that may be implemented to adjust or otherwise vary the number of simultaneous and separate connections that are employed for downloading separate data chunks of a single data file across a network from a single backend data source. A common file hashing algorithm may be extended to provide hashing by parts on multiple sets of data bytes, and may be implemented together with connection logic executing on a frontend client system and the leveraging of backend components.

24 Claims, 5 Drawing Sheets

(56) References Cited

U.S. PATENT DOCUMENTS

| | | | | |
|---|---|---|---|---|
| 7,539,762 | B2* | 5/2009 | Achtermann | H04L 67/06 709/218 |
| 7,617,178 | B2* | 11/2009 | Chavez | H04L 67/104 |
| 7,730,215 | B1* | 6/2010 | McCorkendale | H04L 63/10 709/250 |
| 7,860,962 | B2* | 12/2010 | White | H04L 29/06027 709/223 |
| 7,899,877 | B2* | 3/2011 | Meaney | G06F 8/63 709/207 |
| 8,131,673 | B2* | 3/2012 | Chavez | H04L 67/104 707/622 |
| 8,201,164 | B2* | 6/2012 | Reus | G06F 8/60 717/177 |
| 8,775,562 | B2* | 7/2014 | Chavez | H04L 67/104 709/218 |
| 8,874,697 | B2* | 10/2014 | Shah | H04L 67/06 709/219 |
| 9,229,933 | B2* | 1/2016 | Campbell | H04L 67/02 |
| 9,438,666 | B2* | 9/2016 | Pang | H04L 67/108 |
| 9,876,847 | B2* | 1/2018 | Campbell | H04L 67/06 |
| 10,185,828 | B2 | 1/2019 | Vidyadhara et al. | |
| 10,382,552 | B2* | 8/2019 | Pacella | H04L 67/1097 |
| 10,439,947 | B2* | 10/2019 | Friel | H04L 47/30 |
| 2003/0145316 | A1* | 7/2003 | McKinlay | G06F 9/44526 717/173 |
| 2004/0054650 | A1* | 3/2004 | Chun | H04M 1/72522 |
| 2007/0288604 | A1* | 12/2007 | Achtermann | H04L 67/06 709/220 |
| 2008/0133771 | A1* | 6/2008 | Vardi | H04L 12/64 709/238 |
| 2008/0170589 | A1* | 7/2008 | Yim | H04L 67/06 370/468 |
| 2009/0024991 | A1* | 1/2009 | Campbell | H04L 67/06 717/173 |
| 2009/0055461 | A1* | 2/2009 | Georgis | H04L 67/1076 709/201 |
| 2010/0185769 | A1* | 7/2010 | Zhang | G06F 16/40 709/227 |
| 2010/0306252 | A1* | 12/2010 | Jarvis | H04L 67/104 707/770 |
| 2011/0225302 | A1* | 9/2011 | Park | H04L 69/14 709/227 |
| 2012/0143986 | A1* | 6/2012 | Robinson | H04L 67/02 709/217 |
| 2012/0207306 | A1* | 8/2012 | Candelore | H04L 67/06 380/287 |
| 2013/0064370 | A1* | 3/2013 | Gouge | H04L 63/0428 380/255 |
| 2014/0026140 | A1* | 1/2014 | Gupta | G06F 11/00 718/104 |
| 2014/0143339 | A1* | 5/2014 | Huang | G06F 16/1834 709/204 |
| 2014/0205156 | A1* | 7/2014 | Tosa | G06K 9/0061 382/117 |
| 2014/0358938 | A1* | 12/2014 | Billmaier | G06F 16/284 707/747 |
| 2015/0095460 | A1* | 4/2015 | Berger | H04L 65/604 709/219 |
| 2015/0207743 | A1* | 7/2015 | Zanger | H04N 21/26258 709/233 |
| 2016/0072874 | A1* | 3/2016 | Campbell | H04L 67/06 709/219 |
| 2017/0195401 | A1* | 7/2017 | Shin | H04L 67/1095 |
| 2017/0346725 | A1* | 11/2017 | Lapidous | H04L 67/28 |
| 2019/0044706 | A1* | 2/2019 | Gauda | H04L 63/0428 |
| 2019/0066143 | A1 | 2/2019 | Dasar et al. | |

OTHER PUBLICATIONS

Ask Ubuntu, "Download Manager for Ubuntu that can open multiple HTTP connections", Available on the Internet prior to the Nov. 28, 2018 filing date of this current patent application, 2 pgs.

Tech Target Network, "HTTP 1.1", Sep. 2005, 3 pgs.

RMTIC, "Meet UGet-The Multi-Threaded Downloader for Ubuntu + Chrome Integration", Jun. 17, 2013, 4 pgs.

SourceForge, "MultiGet File Downloader", Jan. 12, 2007, 1 pg.

Wikipedia, "Peer-to-peer", Printed from Internet Nov. 15, 2018, 16 pgs.

* cited by examiner

SYSTEMS AND METHODS FOR DOWNLOADING DATA CHUNKS USING A VARYING NUMBER OF SIMULTANEOUS CONNECTIONS

FIELD

This invention relates generally to information handling systems and, more particularly, to downloading data to an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Downloading large data files can be time-consuming for users, particularly those with poor internet connections. Additionally, data integrity checks against downloaded data can take minutes to complete and cannot begin until the file has completed downloading. For example, calculating the SHA256 hash for a 6-7 gigabit (Gb) file can last up to ten minutes (depending on CPU performance). Multiple simultaneous Transmission Control Protocol/Internet Protocol (TCP/IP) connections have been used for downloading in an attempt to reduce download time, although using multiple simultaneous connections can sometimes slow download of data.

A protocol has been implemented in the past to optimize peer-to-peer file sharing by breaking up downloads into chunks and maximizing the number of connections to peers, and also offload bandwidth from the file source to other clients.

An existing service is used to transfer files in the background to download files across one connection in a low-priority fashion such that the end-user does not perceive a degraded Internet experience during the download. BITS also supports resuming in the case of unplanned shutdowns and network interruptions.

An application was developed in the past to provide the ability to resume downloads in a manner similar to some current web browsers, as well as to allow users to manually specify a static number of multiple HTTP connections to use during a download without data validation to increase download speed.

An existing library supports downloading via many protocols (such as HTTP/FTP/SFTP/BitTorrent) and also supports multiple HTTP connections.

Hypertext Transfer Protocol (HTTP) 1.1 provides support for resume and range/offset request that allows for web clients to implement chunking and resume capabilities.

SUMMARY

Disclosed herein are systems and methods that may be implemented to adjust or otherwise vary the number of simultaneous and separate connections that are employed for downloading separate portions (data chunks) of a single data file across a network from a single backend data source (e.g., a web server). In one embodiment, the disclosed systems and methods may employ a logic engine to optimize data download speed for a data file by dynamically adjusting (e.g., ramping up and ramping down) the total number of simultaneous active download connections in a manner that maximizes download speed during the duration of the download process for the entire single data file. This capability is advantageous since employing a greater number of simultaneous connections does not always increase data download speed, and may actually slow data download speed under some circumstances. In a further embodiment, the logic engine of the disclosed systems and methods may dynamically adjust the total number of simultaneous active download connections (i.e., up and down as appropriate) in a manner that minimizes the number of simultaneous active connections (e.g., down to only one connection if possible) while at the same time maximizes overall download speed.

In one embodiment, a file hashing algorithm (e.g., including commonly available file algorithm/s) may be extended to provide hashing by parts on multiple sets of data bytes, and may be implemented together with connection logic executing on a frontend client system and the leveraging of backend components (e.g., backend system storing and providing expected partial-file hashes to the client system), to make possible one or more of multiple different features. Examples of such features include, but are not limited to, decreasing time required to download relatively large files (e.g., such as file sizes that require greater than 30 seconds to download on a given user's operational Internet connection), sometimes as much as by half the time as compared to conventional file download techniques (depending on network conditions); performing near-real-time data integrity validation on downloaded data during the receipt of the downloading file by the client system; on-the-fly re-downloading of file portions that do not pass data integrity validation; providing full resume capability for file integrity hashing even after unplanned shutdown (i.e., once any data is validated, it does not require re-validation upon resumption of the file download); providing full resume capability for a current file download even after unplanned shutdown; maximizing download speeds by real time addition of new connections and/or deletion of existing connections depending on changing download conditions; and optimization of initial download settings via user download telemetry analytics on the backend system.

In one respect, disclosed herein is a method, including: simultaneously downloading separate and different portions of a single data file in multiple separate simultaneous connections across a network at a first information handling system from a second information handling system, each of the simultaneous connections downloading a different portion of the single data file; increasing and decreasing the number of multiple simultaneous connections that are simultaneously downloading the separate and different portions of the single data file at the first information handling system from the second information handling system; and assembling the separately downloaded portions of the single data file into the complete single data file on the first information handling system.

In another respect, disclosed herein is a method, including: simultaneously downloading separate and different portions of a single data file in multiple separate simultaneous connections across a network to a first information handling system from a second information handling system, each of the simultaneous connections downloading a different portion of the single data file as a partial file; calculating a first hash value of each given one of the downloaded partial files as received at the first information handling system; receiving a second hash value of each given one of the downloaded partial files at the first information handling system from the second information handling system, the second hash value being calculated on the second information handling system before transmittal to the first information handling system; then comparing the first hash value to the second hash value of each given downloaded partial file on the first information handling system to determine if the first hash value is the same as the second hash value for the given downloaded partial file; and then only one of: appending the given downloaded partial file to other downloaded partial files of the same single data file stored on non-volatile storage of the first information handling system if the first hash value is the same as the second hash value for the given downloaded partial file, or deleting the given downloaded partial file without appending the given downloaded partial file to other downloaded partial files of the same single data file if the first hash value is not the same as the second hash value for the given downloaded partial file, and requesting a download of a new copy of the data of the given downloaded partial file from the second information handling system.

In another respect, disclosed herein is a system, including at least one programmable integrated circuit coupled to at least one non-volatile storage, the programmable integrated circuit being programmed to simultaneously download separate and different portions of a single data file in multiple separate simultaneous connections across a network at a first information handling system from a second information handling system with each of the simultaneous connections downloading a different portion of the single data file; and to at least one of: The at least one programmable integrated circuit may also be programmed to at least one of: increase and decrease the number of multiple simultaneous connections that are simultaneously downloading the separate and different portions of the single data file at the first information handling system from the second information handling system, and to assemble the separately downloaded portions of the single data file into the complete single data file on the non-volatile storage of the first information handling system; or calculate a first hash value of each given one of the downloaded partial files as received at the first information handling system, receive a second hash value of each given one of the downloaded partial files at the first information handling system from the second information handling system, the second hash value being calculated on the second information handling system before transmittal to the first information handling system, then compare the first hash value to the second hash value of each given downloaded partial file on the first information handling system to determine if the first hash value is the same as the second hash value for the given downloaded partial file, and then only one of: append the given downloaded partial file to other downloaded partial files of the same single data file stored on non-volatile storage of the first information handling system if the first hash value is the same as the second hash value for the given downloaded partial file, or delete the given downloaded partial file without appending the given downloaded partial file to other downloaded partial files of the same single data file if the first hash value is not the same as the second hash value for the given downloaded partial file, and request a download of a new copy of the data of the given downloaded partial file from the second information handling system.

DESCRIPTION OF ILLUSTRATIVE EMBODIMENTS

Figure 1:
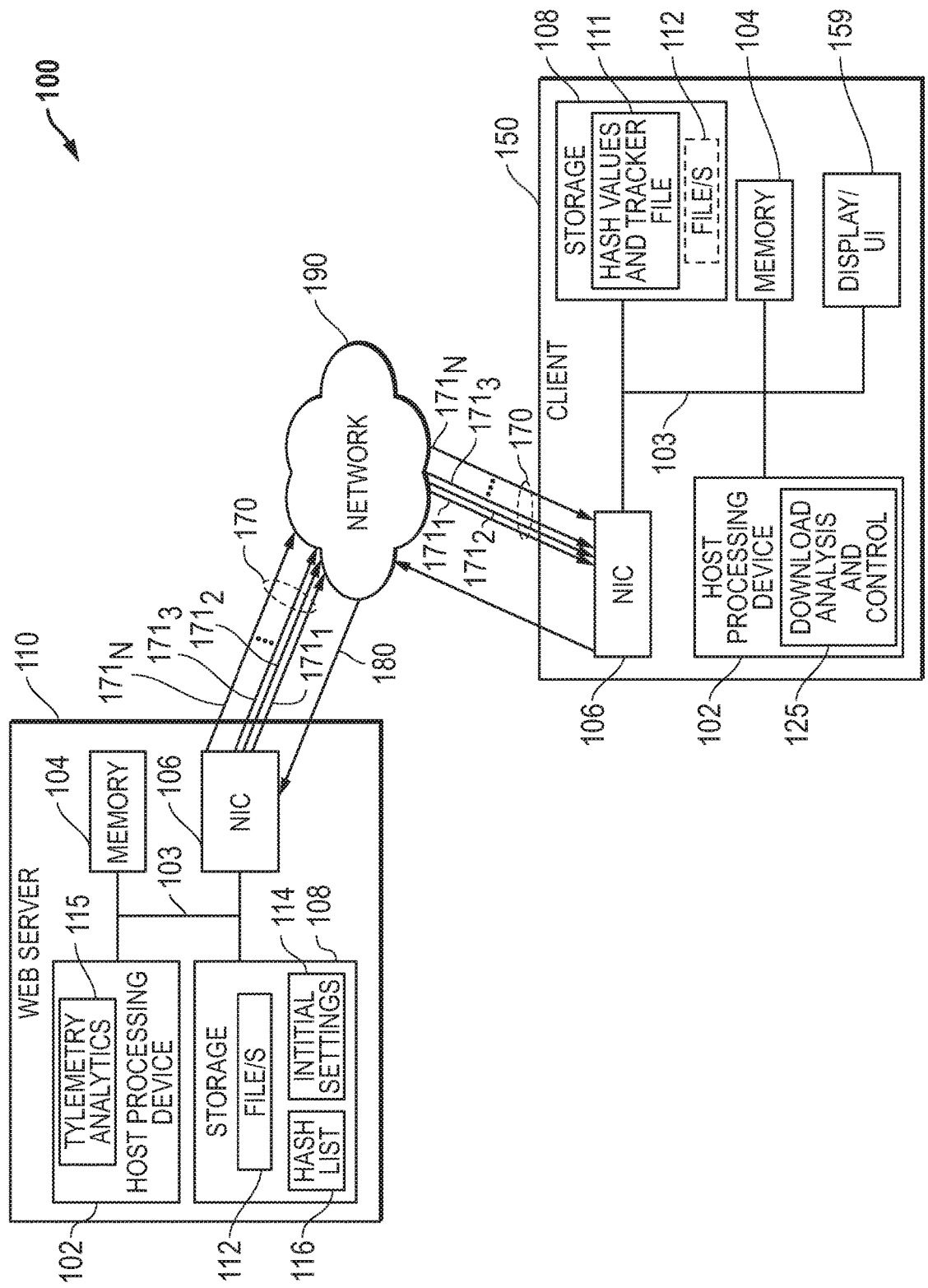
FIG. 1 illustrates a network architecture according to one exemplary embodiment of the disclosed systems and methods.

FIG. 1 illustrates one exemplary embodiment of a network architecture 100 that includes a backend information handling system 110 that is communicating (e.g., via TCP/IP or Internet protocol) with a frontend client information handling system 150 across a network 190 (e.g., such as the Internet, corporate intranet, local area network, etc.). In this embodiment, backend system 110 is a web server that is configured to download files/s 112 to frontend client system 150 which may be, for example, desktop or tower computer system, mobile information handling system (e.g., notebook or laptop computer, tablet, smart phone, convertible computer, etc.). It will be understood that in other network architectures, two or more frontend client systems may be similarly coupled to receive different file downloads from two or more respective backend systems, with each backend system downloading a complete single file to a given frontend system across a network 190.

In FIG. 1, each of systems 110 and 150 includes at least one host processing device 102 (e.g., AMD or Intel-based CPU such as Itanium or any other type of suitable host processing device), one or more buses or communication media 103 (e.g., PCIe bus, USB, SMBus, SATA, other appropriate data buses such as memory bus, etc.), non-volatile persistent storage 108 (e.g., hard disk drive/s, solid state drive/s "SSDs" and or other non-volatile memory), and system volatile memory (e.g., DRAM) 104. The host processing device/s 102 of systems 110 and 150 may each execute a host operating system (OS) such as Microsoft Windows-based OS, Linux-based OS, Android OS, iOS, etc. Bus/es 103 provides a mechanism for the various components of each of systems 110 and 150 to communicate and couple with one another. Each of systems 110 and 150 may be provided as shown with a network interface card (NIC) 106 that is communicatively coupled to network 190 to allow various components of each system 110 to communicate through NIC 106 with components of system 150 across network 190.

As further shown in FIG. 1, at least client system 150 may include video display device (e.g., LCD display, LED display, etc.) and user interface (UI) component/s 109 that may be optionally integrated into one component (e.g., LCD or LED display touchscreen device) for displaying information to human users and for receiving user input from human users, and/or may include separate video display and input/output (I/O) components (e.g., mouse, keyboard, etc.) for performing the same functions. Display/UI component/s 159 may be coupled to bus 103 of system 150 and/or directly to host processing device 102 of system 150 as shown, depending on the particular configuration of the given system (e.g., coupled directly to integrated graphics of a host processing device 102 and/or separately coupled via bus 103 to provide user input signals to host processing device 102 through other components and/or to receive video information from a graphics processor unit "GPU").

As shown, frontend client system 150 may be configured to obtain downloaded data file/s 112 across network 190 from storage 108 of backend system 110, and to save them to storage 108 of frontend system 150 (as shown by the dashed box 112) for future access and/or execution. As illustrated, each single file 112 may be downloaded in a file download session 170 from backend system 110 to frontend system 150 via multiple simultaneous connections $171_1$ to $171_N$ (e.g., multiple TCP/IP connections). As described herein, a data file download session 170 refers to the complete data transfer of a single file 112 between backend system 110 to frontend system 150. As will be described further herein, the number of separate connections 171 may be dynamically varied during the download of the single file under the control of download analysis and control logic 125 (e.g., software code and/or firmware code) executing on processing device 102 as an engine of frontend system 150. Four or more simultaneous download connections 171 are shown in FIG. 1 for purposes of illustration, however, it will be understood that the varying number of connections 171 that are active at any given time during a given file download session 170 for single file 112 may be varied to be as few as one connection 171, and/or or may be controlled to be two or more connections 171 at any given time.

As described further herein, backend system 110 may execute telemetry analytics logic 115 (e.g., software client application and/or firmware code) on its host processing device 102 to analyze download telemetry data 180 in real time or otherwise as provided from executing logic 125 of frontend system 150 during a file download session 170. Download telemetry data 180 may include, for example, download speeds across network 190 experienced over the lifetime of a given download session 170 of a single file 112, number of simultaneous connections, file size, region/country, Internet service provider (ISP), file host, etc. In one embodiment, this telemetry data 180 may be used by telemetry analytics logic 115 to determine and build a collection of optimized initial download settings 114 (e.g., by region, ISP, bandwidth, host, etc.) which may be stored on storage 108 of backend system 110 as shown. Initial download setting 114 may be employed by backend system 110 at the start of a subsequent download session 170 to the same client system 150. Such initial download settings 114 may include, for example, number of file chunks (simultaneous connections 171) to start a download session 170 with, e.g., such as specifying two initial connections instead of a default of one initial connection, etc.

In this regard, download analysis and control logic 125 on client system 150 may execute to analyze in real time changes in download speed for single file 112 while considering effective data throughput, end-to-end. During the life of a download of a single file 112, logic 125 may vary the number of simultaneous connections 171 for the purpose of maximizing download speed (e.g., see the exemplary methodology of FIGS. 2A and 2B), which is in contrast to using a static number of connections in a conventional technique. As further shown in FIG. 1, in one embodiment backend system 110 may also maintain a hash list 116 on its storage 108. Such a hash list 116 may include a list of hash calculations from various pre-defined offsets in the current download file 112 (that define individual chunks of the download file 112), which is served or otherwise provided to the client system 150. Hash calculation values from this hash information provided to client system 150 by backend system 110 may be compared to separate hash calculation values calculated by client system 150 on the same downloaded data chunks received by the client system 150. This hash value comparison allows client system 150 to determine during the download session 170 whether any downloaded chunks of the current file 112 are corrupt, allows for validation of individual chunks, and removes the need to re-download entire files in case of any corruption as described in relation to FIG. 3 herein.

In one embodiment hash list 116 may include a hashing library that is extended both to allow for multiple sets of bytes to be passed in, and to be serialized such that the state of an incomplete hash calculation may be saved to a file to be picked up later for completion, e.g., as further shown and described in relation to the methodology embodiment of FIG. 3. This is in contrast to conventional has libraries that are typically built to only process a single array of bytes (or a single file).

Figure 3:
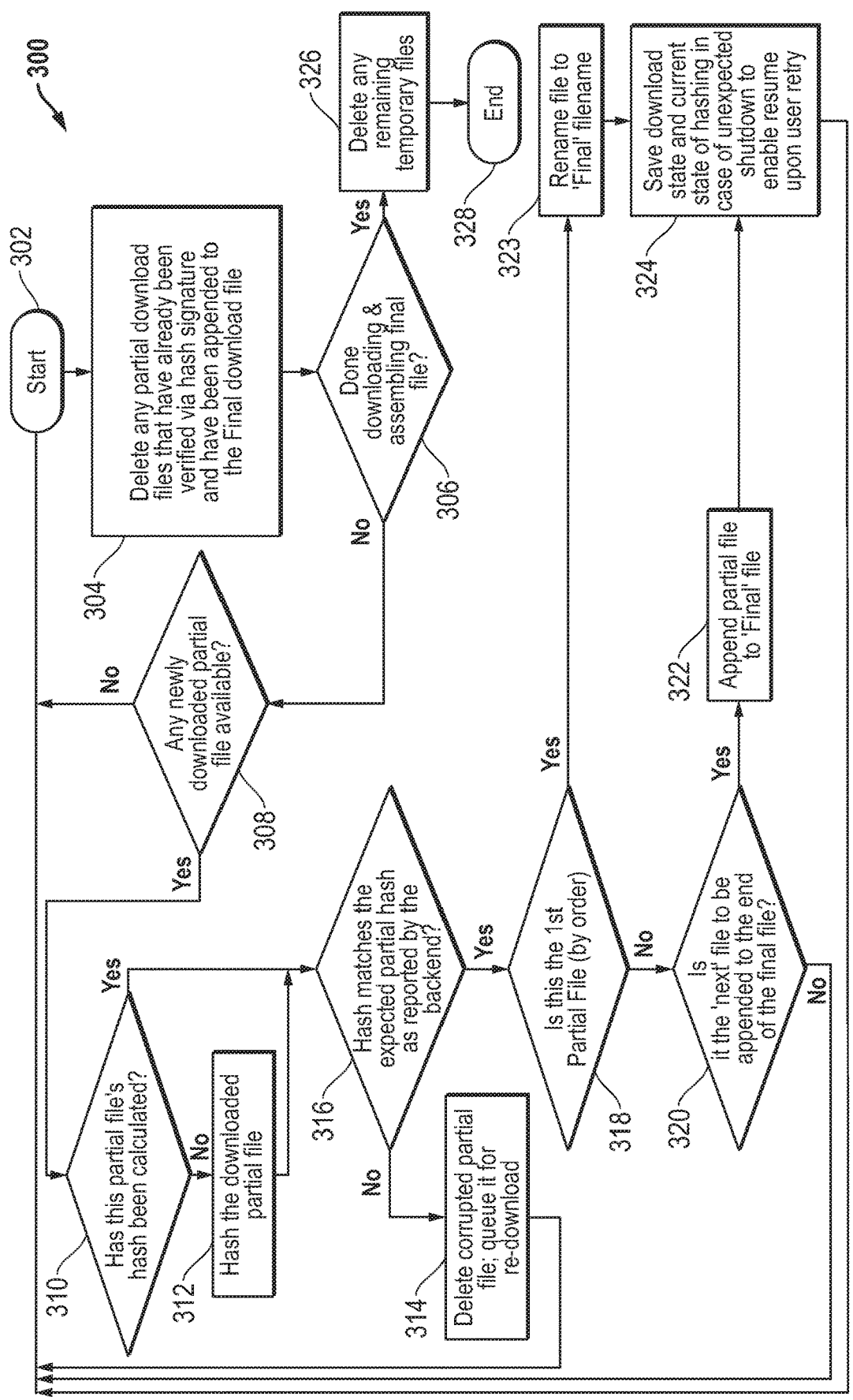
FIG. 3 illustrates process flow according to one exemplary embodiment of the disclosed systems and methods.

In one embodiment, using the disclosed hash list 116 of backend system 110 and methodology of FIG. 3 allows data to be validated on frontend system 150 during the file download session 170 thereby avoiding additional delay after the download session 170 completes, and further allowing for hashing to resume in case of an unplanned shutdown/restart or other breaks in the data file download session process. Further, integrity checks are enabled to be performed on the data irrespective of the source (remote server vs. local cache or from a peer within the local network). HTTPS is therefore no longer required for the actual file download. The original URL for the file 112 and associated hash may be provided via a web application programming interface (API) using HTTPS, but the download may simply use HTTP without HTTPS.

It will be understood that FIG. 1 is exemplary only, and that the disclosed systems and methods may be implemented with other network configurations and configurations of information handling systems that each may include fewer, additional and/or alternative hardware and/or software/firmware components as well as any type/s of processing devices suitable implementing the disclosed systems and methods such as central processing units (CPUs), embedded controllers, keyboard controllers, microcontrollers, application specific integrated circuits (ASICs), field programmable gate arrays (FPGAs), etc. Moreover, in some embodiments, a backend system 110 (e.g., web server) may also include components such as baseboard management controller (BMC) and/or remote access controller (RAC) having one or more out-of-band processing devices and non-volatile memory (e.g., embedded and partitioned flash memory, Electrically Erasable Programmable Read Only Memory—EEPROM, other types of non-volatile random access memory "NVRAM", etc.) that stores remote access controller component firmware 207. Examples of such a remote access controller include an integrated Dell Remote Access Controller (iDRAC) available from Dell Technologies Inc. of Round Rock, Tex., etc.). Further information on possible configuration and operation of backend systems e.g., servers), client systems, and network communications between the same in the practice of the disclosed systems and methods may be found in United States Patent Application Publication 2017/0270301, and in U.S. patent application Ser. No. 15/691,325 filed Aug. 30, 2017, each of which is incorporated herein by reference its entirety for all purposes.

Figure 2A:
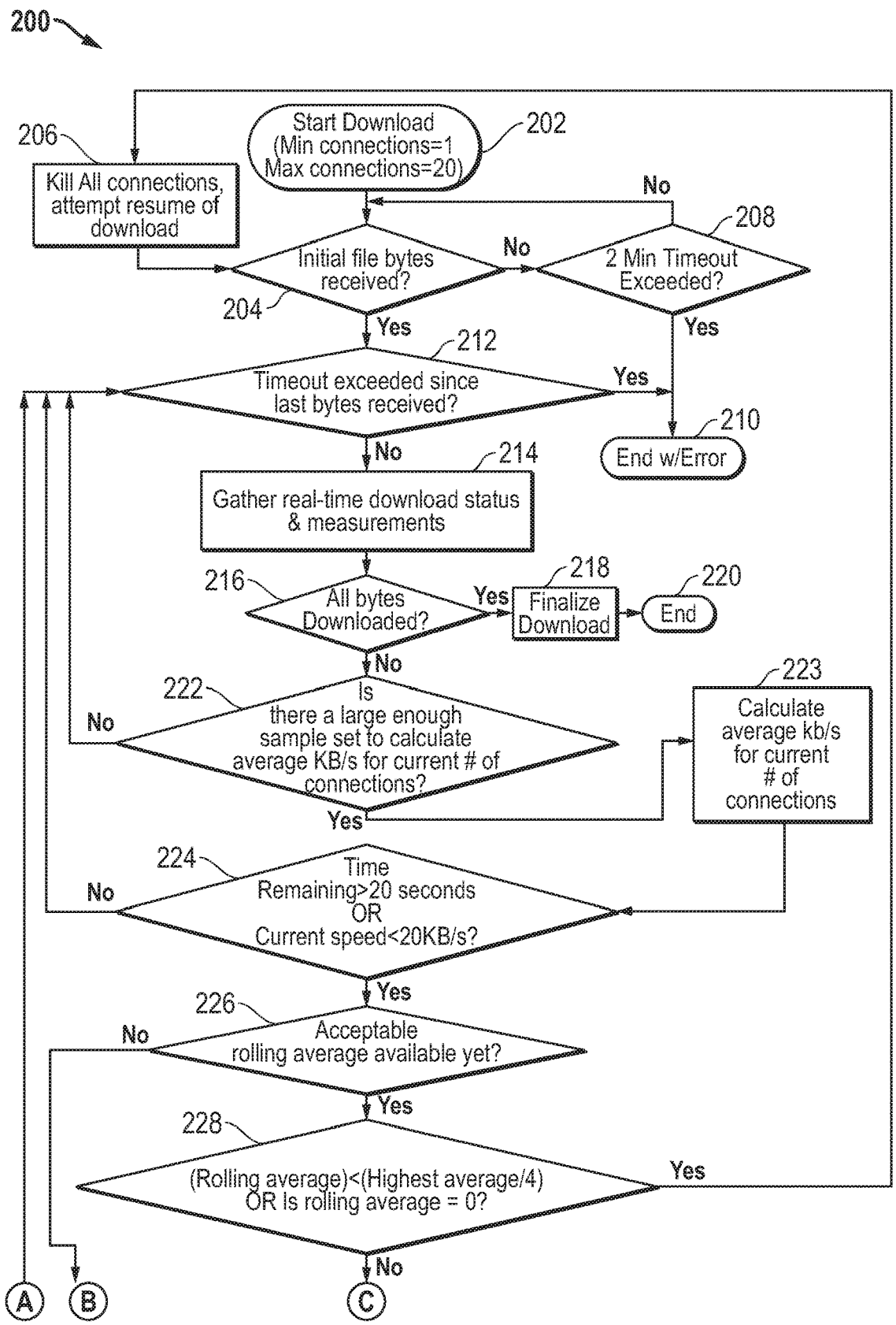
FIG. 2A illustrates methodology according to one exemplary embodiment of the disclosed systems and methods.
Figure 2B:
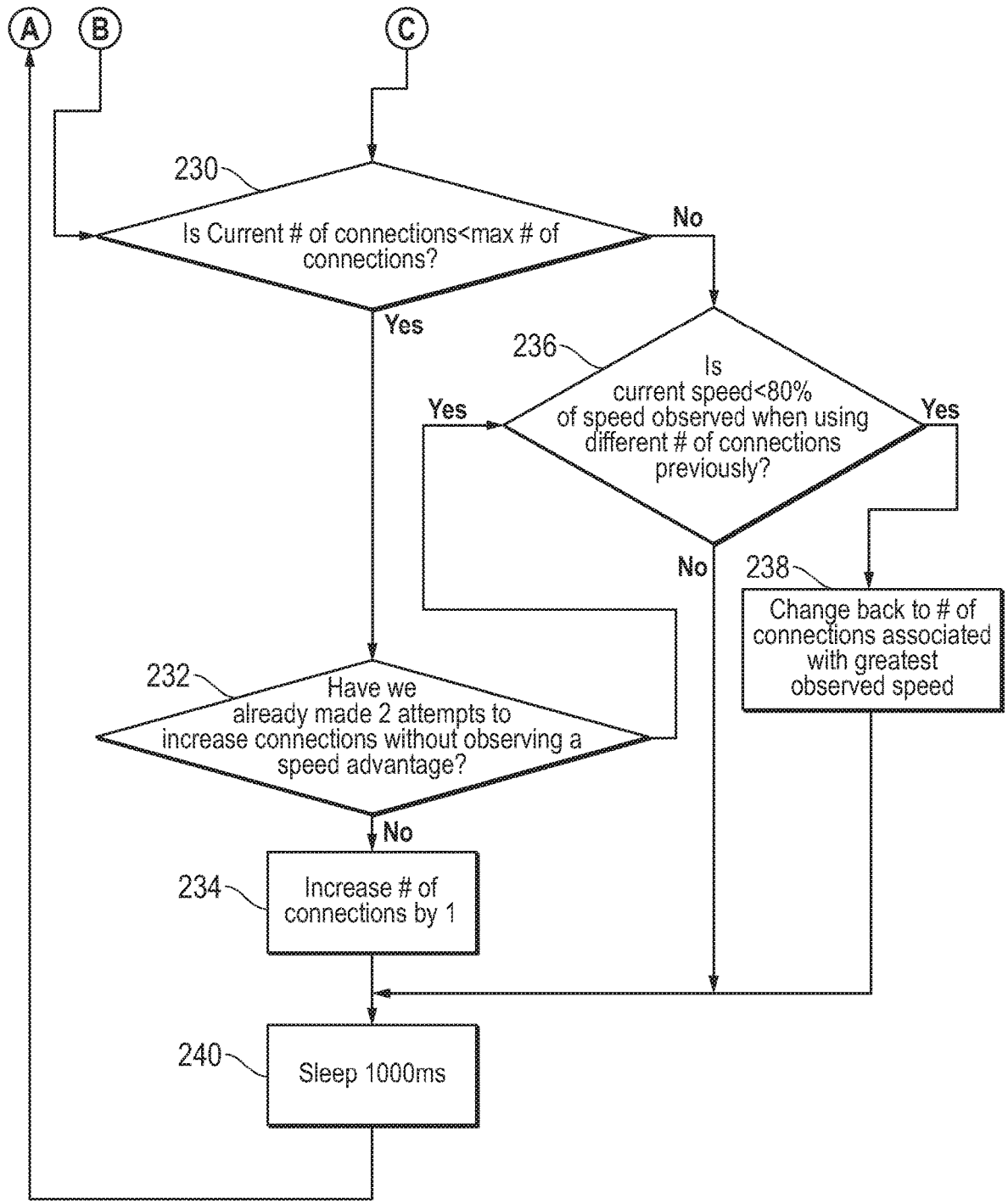
FIG. 2B illustrates methodology according to one exemplary embodiment of the disclosed systems and methods.

FIGS. 2A and 2B illustrate one exemplary embodiment of a methodology 200 that may be implemented in the background (e.g., in part or in whole by download analysis and control logic 125 executing on client system 150) during a given file download session 170. Methodology 200 may be so implemented to adjust or otherwise vary the number of simultaneous connections 171 that are employed for downloading a single data file 112 across a network 190 to a frontend client system 150 from a single backend data source (e.g., a web server) 110. For purposes of illustration only, FIGS. 2A and 2B are described herein in relation to the network architecture embodiment 100 of FIG. 1, it being understood that methodology 200 may be employed with other network architecture embodiments, e.g., having different numbers and/or types of backend and frontend information handling systems coupled together in any suitable manner for data transfer.

As shown in FIGS. 2A and 2B, methodology 200 begins in step 202, where a download session 170 for a single file 112 begins from backend source 110 to frontend system 150. Step 202 may begin, for example, based on a data file download request provided from frontend system 150 to backend system 110 across network 190. A timer may also be started in step 202 by download analysis and control logic 125 executing on client system 150. In the illustrated embodiment, the file download for the download session 170 may begin using a minimum number of one connection up to a maximum number of twenty simultaneous connections, although these example numbers of connections are exemplary only, and it is also possible that a download may begin with more than twenty simultaneous connections. Such initial number of connections may in one embodiment be determined or set by backend system 110 from information of initial settings 114 on backend system 110, e.g., such as maximum single file download speed obtained during a previous file download session as reported as telemetry 180 from frontend client system 150 across network 190 to backend system 110.

In one embodiment, step 202 may begin in step 202 with a single connection 171, which may then be adjusted by adding one or more additional simultaneous connections 171 over time as further described herein in order to maximize download speed using a minimum number of simultaneous connections 171. During the download session 170, individual data chunks of the same data file 112 (e.g., each having a data size of 20 megabytes or other selected greater or lesser size) may be simultaneously transferred on different parallel connections 171 between backend system 110 and frontend system 150.

Next, logic executing on frontend system 150 may then verify in step 204 that initial file bytes of the requested data file 112 have been received by client system 150. If not, methodology proceeds to step 208 where the elapsed time since start of the current download session 170 of step 202 is compared to a predefined data timeout threshold (e.g., two minutes or other selected greater or lesser time). If not, methodology 200 returns to step 204 and repeats. However, once the data timeout threshold has been found exceeded in step 208, then methodology 200 ends with error in step 210, e.g., by terminating the data download session 170 and optionally displaying an error message to a human user on display/UI 159.

Returning to step 204, if initial file bytes of the requested data file 112 have been received by client system 150, then methodology proceeds to step 212 where it is determined whether any other threshold time described further below has been exceeded. If not, then in step 214 real-time download status and total file download speed (e.g., kilobytes per second or other unit of download rate unit of measure) are measured for each iteration of step 214. In one embodiment, time between each iteration may be one second, although greater or lesser iteration times are alternatively possible. The current gathered total download speed measurement is then averaged (or other statistical value such as median value) with total download speed measurements of each previous iteration of step 214 of the current sample set, i.e., since the last sufficiently large sample set average was calculated as per criteria of step 222 described further below. In one embodiment, the gathered real time download status of step 214 may be in the form of current connection status, current total throughput speed in kilobytes per second, total percentage of file downloaded, and a running table of kilobytes per second speed samples by number of connections. In one embodiment, this gathered real time download status information used for purposes of, for example, deciding whether to change the current number of connections to maximize speed, updating the download status on the user interface, prompting the user to retry or check their connection in the case of a network problem, etc. In one embodiment, averages and download status information may be temporarily stored in memory 104 of client system 150 for use in other steps of methodology 200, e.g., such as steps 223 and 223.

Next, in step 216 it is determined whether all bytes of the requested data file 112 have been downloaded to the frontend client system 150 for the current file download session 170. If so, then the download for the current file download session 170 is finalized on the frontend system 150 by deleting any temporary files used during the download and updating the user interface 159 to notify the user of the completion of the download in step 218, and methodology 200 ends in step 220 with the end of the current file download session 170 and any necessary communication between frontend system 150 and backend system 110 to finalize the completed download of single file 112 occurs across network 190. However, if all bytes of the requested data file 112 are found not to have been downloaded for the current file download session 170 in step 216, then methodology 200 proceeds to step 222 where it is determined whether the threshold criteria for a sufficiently large sample set of averaged iteration total download speeds has been met to proceed with calculation of an average data total download rate to be used for the current number of simultaneous download connections 171. If not, then methodology 200 returns to step 212 and repeats. In one embodiment, an example predefined criteria for determining a sufficiently large sample set in step 222 may be a minimum total of twelve samples taken one second apart during the previous twelve seconds and calculated as a rolling average, although greater or lesser values may alternatively be employed.

If the predefined criteria for a sufficiently large sample set is determined to be met in step 222, then methodology 200 proceeds to step 223 where average data total download speed is calculated for the current number of simultaneous download connections 171. Then, in step 224 it is determined whether at least one of the remaining file download time for the current file download session 170 is greater than a predefined threshold time, and/or whether the calculated download speed for the current sample is less than a threshold download speed. In one exemplary embodiment the predefined threshold time for step 224 may be 20 seconds, although greater or lesser values are alternatively possible. In one exemplary embodiment the predefined threshold download speed for step 224 may be 20 kilobytes/second, although greater or lesser values are alternatively possible. It is also alternatively possible that only one of the above-described remaining time or download speed criteria for step 224 may be employed, and/or that other criteria may be employed in step 224.

If neither of the predefined criteria of step 224 are met, then methodology 200 returns to step 212 and repeats as before. However if neither of the predefined criteria of step 224 are met, then methodology 200 proceeds to step 226 where it is determined whether an acceptable rolling average of total current download speed is yet available. Pre-defined criteria for determining whether such an acceptable rolling average is available may in one embodiment be set to be whether an average total download rate has been collected and calculated using at least 10 sample sets, which in one embodiment may be taken 1000 milliseconds apart, although greater or lesser number of collected samples sets may alternatively be set as a pre-defined criteria for step 226. Moreover, intervals between sample sets may alternatively be greater or lesser than 1000 milliseconds apart.

If criteria for a rolling average is determined to be met in step 226, then methodology proceeds to step 228 where it is determined whether the rolling average download speed is less than a predefined threshold (e.g., highest download speed average value divided by four) and/or whether the rolling average download speed is equal to zero. In one embodiment, the highest download speed average value may be equal to the highest overall rolling download speed average (e.g., in kilobytes/second) observed during the lifetime of the current file download session 170 for given data file 112. It is alternatively possible that only one of the above-described remaining rolling average download speed criteria for step 228 may be employed, and/or that other criteria may be employed in step 226. If either or both of the predefined criteria of step 228 are met, then methodology 200 returns to step 206 and repeats as before. However, if neither of the predefined criteria of step 228 are met, then methodology 200 proceeds to step 230 where it is determined if the current number of simultaneous connections 171 of the current data download session 170 are less than a predefined maximum threshold number of simultaneous connections which may be set, for example, depending on data bandwidth capacity of network 190, e.g., such as eight simultaneous connections or other greater or lesser number of simultaneous connections suitable for bandwidth of network 190. In one embodiment, the maximum threshold number of simultaneous connections may be later adjusted upwards or downwards, e.g., the maximum number of simultaneous connections increased as future network conditions make the use of a greater connections desirable for increased throughput, or the maximum number of simultaneous connections decreased as possible future agreements with cloud providers limit the number of attempted concurrent connections from a single user.

If it is determined in step 230 that the current number of simultaneous connections 171 of the current data download session 170 are less than a predefined maximum threshold number of simultaneous connections in step 230, then in step 232 it is determined whether a predefined minimum number of attempts (e.g., in this case two, although the predefined increase value may be one or may be greater than two in other embodiments) have been previously made to increase the current number of simultaneous connections 171 of the current session 170 without observing an increase in total file download speed of the session 170 (e.g., as measured in latest iteration of step 223). If so, then methodology 200 proceeds to step 234 where frontend system 150 transmits a request across network 190 to backend system 110 asking for an increase in the number of simultaneous connections 171 of the current data file download session 170 by a predefined number of connections 171 (e.g., in this case by one, although the predefined increase value may be greater than one in other embodiments). This request for increased number of simultaneous connections 171 of the current data file download session 170 is fulfilled by backend system 110 in step 234. Then, methodology 200 sleeps in step 240 for a predefined delay time (e.g., 1000 milliseconds in this embodiment although predefined delay time periods may be greater or lesser than 1000 milliseconds in other embodiments to achieve a desired number of samples per second), before returning to step 212 and repeating as before.

As further shown in FIGS. 2A and 2B, methodology 200 proceeds from step 230 to step 236 if it is determined in step 230 that the current number of simultaneous connections 171 of the current data download session 170 are not less than a predefined maximum threshold number of simultaneous connections 171 in step 230. Similarly, methodology 200 proceeds from step 232 to step 236 if it is determined in step 232 that the predefined minimum number of attempts have not been previously made to increase the current number of simultaneous connections 171 of the current session 170 without observing an increase in total file download speed. In either case, methodology 200 determines in step 236 if the total file download speed of the current session 170 (e.g., as measured in latest iteration of step 223) is less than a predefined threshold download speed (e.g., 80% or other suitable greater or lesser predefined value) previously measured during other iterations of methodology 200. If not, then step 236 proceeds to previously-described step 240. However, if it is determined in step 236 that the total file download speed of the current session 170 is less than a predefined threshold download speed previously measured during other iterations of methodology 200 then frontend system 150 transmits a request across network 190 to backend system 110 asking for a decrease in the number of simultaneous connections 171 employed for the current file download session 170 to a previously-employed number of connections 171 that resulted in the greatest total file download speed previously measured for the current download session 170. This request is then fulfilled by backend system 110 so that the number of simultaneous connections 171 of the current file download session 170 is accordingly changed back in step 238 (e.g., decreased in number). Step 238 then proceeds to previously-described step 240.

Still referring to FIGS. 2A and 2B, after an unplanned download termination (e.g., due to shutdown of frontend system 150 and/or backend system 110, loss of network connection, etc.), downloading of the requested single file 112 may be resumed upon a request transmitted across network 190 from frontend system 150 to backend system 110 when frontend system 150 is again ready to receive the downloaded data. At this time, methodology 200 of FIGS. 2A and 2B may re-start at step 202, but this time with backend system 110 resuming the download at the stopping point using the optimized initial download settings 114 as most recently updated by telemetry analytics 115 in a manner as previously described (e.g., using the number of simultaneous connections 171 that were previously employed at the time of download termination or that previously resulted in the highest total data download speed). However, in another embodiment, a terminated incomplete download session 170 may be alternatively resumed at the stopping point, but using the original pre-defined initial download settings (e.g., such as starting with the minimum number of connections 171 as before. Further information on methodology for resuming terminated download sessions that are incomplete is found in FIG. 3.

FIG. 3 illustrates one exemplary embodiment of a methodology 300 that may be implemented (e.g., in part or in whole by download analysis and control logic 125 executing on frontend client system 150) during a given file download session 170 for hashing and verification of partial segments or chunks of a single data file 112, and for appending the separate verified downloaded chunks together into a final completed downloaded data file 112 on frontend client system 150. As illustrated and described in relation to FIGS. 1 and 2 these separate partial file segments or chunks of a single data file 112 are separately downloaded onto non-volatile storage 108 of frontend system 150 from backend system 110 in separate simultaneous connections 171 during a common data file download session 170. During this download session, backend system 110 provides pre-calculated hash values for each partial file (or chunk) from hash list 116 and transmits these values on-demand to the client system 150 across one of connections 171. Any suitable hashing technique may be so employed, e.g., such as SHA256 hash, MD5 hash, etc.

Figure 4:
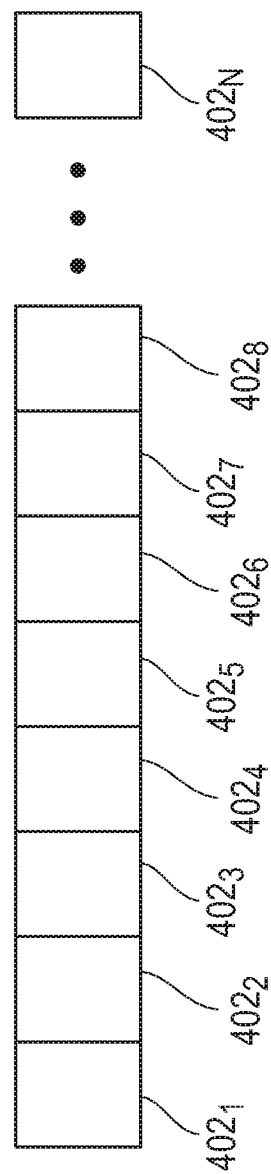
FIG. 4 illustrates partial files of a single data file that are assembled together according to one exemplary embodiment of the disclosed systems and methods.

As shown in FIG. 3, methodology 300 starts in step 302 and begins by deleting any partial download files (i.e., chunks) 402 from frontend system storage 108 in step 304 that have already been verified by hash signature and then appended in proper sequential order relative to other partial files of the final download file 112 (as illustrated in FIG. 4) and stored in storage 108 of frontend system 150. Next, if the complete data file 112 of the current file download session 170 is found in step 306 to be downloaded and assembled in proper sequence from multiple partial files $402_1$ to $402_N$ into a complete final downloaded data file 112 on storage 108 of frontend client system 150, then methodology 300 proceeds to step 326, where any remaining temporary files are deleted, and methodology 300 ends in step 328.

Examples of types of such temporary files that may remain at step 326 include data chunk/s that are either partially or completely downloaded but not appended to the final complete downloaded file (e.g., some orphaned data chunks may exist such as in the event there was an unrecoverable error during an earlier download attempt), and a hash values and "tracker" file 111 that contains information on the current state of a current file download (including identity of which data chunks are completely downloaded, and any hashes or partial hashes that have already been calculated) which is what allows for resumption of a file download to occur at the last stopping point after, for example, an unplanned or accidental shutdown of the client system 150. Saving hash values and tracker file 111 allows for partial hashing of files, e.g., if only 50% of a partial file is 'hashed' that state is saved on client system storage 108 so that the hash value of the first half of the file need not be re-calculated in the event of the occurrence of an unplanned termination and restart, resume, etc. of the current file download session 170.

Thus, if the current data file 112 is found in step 306 to be only partially downloaded during the current data download session 170, this means that additional partial files 402 of data file 112 remain to be downloaded to be assembled together with previously-received partial files in proper sequence $402_1$ to $402_N$ into the complete downloaded data file 112. As described further below, these additional partial files 402 may or may not be received by frontend client system 150 in proper order (i.e., sequence) for assembly into the completed file 112. For example, partial file $402_3$ of data file 112 may be first received by frontend system 150 before partial file $402_2$ is received, however partial file $402_2$ must be appending to partial file $402_1$ before partial file $402_3$ can be appended to partial file $402_2$, and so on with each successively numbered partial file 402 as shown in FIG. 4.

If it is found in step 306 that the current data file 112 is only partially downloaded during the current data download session 170, then methodology 300 proceeds to step 308, where it is determined whether there is any newly downloaded partial file 402 stored in frontend system storage 108 for a current file download session 170. If not then, methodology 300 returns to step 302 and repeats. However, if a new downloaded partial file $402_X$ is found downloaded onto system storage 108 in step 308, then it is determined in step 310 whether a hash value has already been fully calculated and has saved values 111 in storage 108 of frontend system 150 for the given new downloaded partial file $402_X$, and if so, methodology 300 proceeds to step 316 where it is determined whether this calculated hash value matches the calculated hash value reported by the backend system 110 together with download of the new partial data file $402_X$. If any hash value is found in step 310 is not fully calculated for the new partial file $402_X$, then the remaining hashing required on the data of the new partial file $402_X$ is performed in step 312 to determine a hash value for the new partial file $402_X$ before proceeding to step 316. In one embodiment, the partially or fully calculated hash for new partial file $402_X$ may be saved on frontend system storage 108 in a file of hash values 111 (e.g., a table that includes calculated hash values and associated byte offsets for corresponding downloaded partial files) that may be later retrieved and picked up for later completion in the event of a download interruption. In the above-described steps, it will be understood that any suitable hash technique may be employed in step 312 that matches the hash technique employed by backend system 110 prior to transmitting the new partial file $402_X$ to frontend system 150.

If in step 316 the calculated hash value for the new partial file $402_X$ does not match the calculated hash value reported by the backend system 110, this indicates the new partial file $402_X$ is corrupted and it is therefore deleted in step 314 and the partial file $402_X$ is re-queued for another download from backend system 110 before methodology 300 returns to step 302 and repeats. In one embodiment, the corrupted partial file $402_X$ may be so re-queued by transmitting a real time request across network 190 during the current download session 170 for real time download of a new copy of data of the partial file $402_X$ from frontend system 150 to backend system 110.

However, assuming that the calculated hash value of the new partial file $402_X$ matches the calculated hash value reported by the backend system 110, then it is determined in step 318 whether the new partial file $402_X$ is the first partial file (i.e., $402_1$) of the current data file 112 that is currently being downloaded by the current data download session 170. If so, then methodology proceeds to step 323 where the partial file is renamed from having a temporary name and sequence suffix (e.g., such as ".p.1" which in this example indicates 1 as its sequence number) to the "final" filename which means that it is given the desired name of the final complete downloaded file 112. Then in step 324 the download state (i.e., identity of which partial files are present due to downloading activities, identity of which partial files have already been validated and appended to the final file, the original name of the file hosted online, and the final filename itself) and current state of hashing (i.e., the partially or fully calculated hash values for each partial file) are each saved as data 111 in storage 108 of client system 150 to enable resumption of download of the current data file 112 at the sequence position of new partial file $402_X$ (i.e., without requiring starting the file download over from the beginning of the data file 112) due to unexpected cessation or pause in the current download session 170, e.g., such as occurring due to shutdown of frontend system 150 and/or backend system 110, loss of network connection, etc. Methodology 300 then returns to step 302 and repeats.

If it is determined step 318 that the new partial file $402_X$ is not the first partial file (i.e., it is one of partial files $402_2$ to $402_N$) of the current data file 112, then methodology goes to step 320 where it is determined whether the new partial file $402_X$ is the next partial file 402 to be appended in proper sequence to the previously-downloaded partial files 402 of the current data file 112 that are stored on storage 108 of frontend system 150. For example, assuming partial files $402_1$ to $402_3$ of the current data file 112 have already been downloaded and appended together in sequence on storage 108 of system 150, then a new partial file $402_4$ would be the next partial file 402 to be appended in sequence to the current data file 112 on storage 108. However, if the new partial file $402_X$ is the not the next partial file 402 to be appended in proper sequence to the previously-downloaded partial files 402 (e.g., such as when the new partial file $402_X$ is partial file 4025 in the above example), then methodology 300 then returns to step 302 and repeats.

If it is determined in step 320 that the new partial file $402_X$ is the next partial file 402 to be appended in proper sequence to the previously-downloaded partial files 402 of the current data file (such as when the new partial file $402_X$ is $402_4$ in the above example), then the new partial file 402 is appended in proper sequence to the previously-downloaded partial files 402 of the current data file that are stored on storage 108 of frontend system 150, and methodology 300 proceeds to step 324 and proceeds as before.

It will be understood that methodologies of FIGS. 2A and 2B, and 3 are exemplary only, and that any combination of fewer, additional and/or alternative steps may be employed that are suitable for adjusting or otherwise varying the number of simultaneous and separate connections that are employed for downloading separate data chunks of a single data file being downloaded from a backend information handling system to a frontend information handling system, and/or for hashing by parts on multiple sets of data bytes of a single data file that may be downloaded in order and/or out of order from a backend information handling system to a frontend information handling system.

It will be understood that one or more of the tasks, functions, or methodologies described herein (e.g., including those described herein for components 102, 104, 106, 108, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions is configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus, the invention is not limited to only those combinations shown herein, but rather may include other combinations.

What is claimed is:

1. A method, comprising:
using a single first data file download session to simultaneously download all separate and different portions of a first complete single data file in multiple separate simultaneous connections across a network to a first information handling system from a second information handling system, each of the simultaneous connections downloading a different portion of the first complete single data file during the first data file download session;
using the first information handling system to adjust a number of the multiple simultaneous connections during the first data file download session by increasing and decreasing the number of multiple simultaneous connections that are simultaneously downloading the separate and different portions of the first complete single data file at the first information handling system from the second information handling system; and
assembling the separately downloaded portions of the first complete single data file into the first complete single data file on the first information handling system.

2. The method of claim 1, further comprising using the first information handling system to adjust a number of the multiple simultaneous connections during the first data file download session by increasing and decreasing the number of multiple simultaneous connections during the download of the separate and different portions of the first complete single data file so as to employ a minimum determined number of active multiple simultaneous connections that results in a maximum overall total data download speed to the first information handling system across the network from the second information handling system.

3. The method of claim 1, further comprising:
starting the simultaneous downloading of the separate and different portions of the first complete single data file using a predetermined minimum number of one or more separate simultaneous connections across the network to the first information handling system from the second information handling system;
then using the first information handling system to iteratively increase the number of multiple simultaneous connections employed to download the separate and different portions of the first complete single data file, and to determine a total data download speed achieved across the multiple simultaneous connections for each of the iterations of increased number of multiple simultaneous connections; and
then using the first information handling system to cease the iterative increasing of the number of multiple simultaneous connections employed during the download of the separate and different portions of the first complete single data file when it is determined that increasing the number of multiple simultaneous connections does not result in an increase in the determined total data download speed achieved across the multiple simultaneous connections for a predetermined number of one or more iterations.

4. The method of claim 3, further comprising:
then using the first information handling system to iteratively decrease the number of multiple simultaneous connections employed to download the separate and different portions of the first complete single data file, and to determine a total data download speed achieved across the multiple simultaneous connections for each of the iterations of decreased number of multiple simultaneous connections; and
then using the first information handling system to cease the iterative decreasing of the number of multiple simultaneous connections employed during the download of the separate and different portions of the first complete single data file when it is determined that decreasing the number of multiple simultaneous connections results in a decrease in the determined total data download speed achieved across the multiple simultaneous connections for a predetermined number of one or more iterations.

5. The method of claim 1, further comprising
then using the first information handling system to iteratively decrease the number of multiple simultaneous connections employed to download the separate and different portions of the first complete single data file, and to determine a total data download speed achieved across the multiple simultaneous connections for each of the iterations of decreased number of multiple simultaneous connections; and
then using the first information handling system to cease the iterative decreasing of the number of multiple simultaneous connections employed during the download of the separate and different portions of the first complete single data file when it is determined that decreasing the number of multiple simultaneous connections results in a decrease in the determined total data download speed achieved across the multiple simultaneous connections for a predetermined number of one or more iterations.

6. The method of claim 1, further comprising:
using the first information handling system to determine data download conditions on the first information handling system during the duration of the download of the separate and different portions of the first complete single data file;
then transmitting the determined data download conditions as telemetry from the first information handling system to the second information handling system;
then using the second information handling system to determine initial data download settings from the determined data download conditions for use with future downloads of separate and different portions of a second and different complete single data file in multiple separate simultaneous connections of a second and different data file download session from the second information handling system to the first information handling system across the network;
then storing the determined initial data download settings on non-volatile storage of the second information handling system; and
then using at least a portion of the determined initial data download settings to begin simultaneously downloading all separate and different portions of the second complete single data file in multiple separate simultaneous connections of the second data file download session across the network to the first information handling system from the second information handling system, each of the simultaneous connections downloading a different portion of the second complete single data file.

7. The method of claim 6, where the determined data download conditions comprise at least one of total data download speeds across the network experienced over the lifetime of the download of the first complete single data file, number of simultaneous connections employed during the download of the first complete single data file, file size, region/country, Internet service provider (ISP) or file host; and where the determined initial data download settings comprises minimum number of simultaneous connections to begin the simultaneously downloading of the separate and different portions of the second complete single data file in the second data file download session.

8. The method of claim 1, where each and every one of the different portions of the first complete single data file are currently downloaded to the second information handling system as a partial file; and where the method further comprises:
calculating a first hash value of each given one of the currently downloaded partial files as received at the first information handling system;
receiving a second hash value of each given one of the currently downloaded partial files at the first information handling system from the second information handling system, the second hash value being calculated on the second information handling system before transmittal to the first information handling system;
then comparing the first hash value to the second hash value of each given currently downloaded partial file on the first information handling system to determine if the first hash value is the same as the second hash value for the given currently downloaded partial file; and
then only one of:
appending the given currently downloaded partial file to other currently downloaded partial files of the same first complete single data file stored on non-volatile storage of the first information handling system if the first hash value is the same as the second hash value for the given currently downloaded partial file, or
deleting the given currently downloaded partial file without appending the given currently downloaded partial file to other currently downloaded partial files of the same first complete single data file if the first hash value is not the same as the second hash value for the given currently downloaded partial file, and requesting another download of a new copy of the data of the given currently downloaded partial file from the second information handling system.

9. A method, comprising:
using a single given data file download session to simultaneously download all separate and different portions of a complete single data file in multiple separate simultaneous connections across a network to a first information handling system from a second information handling system, each of the simultaneous connections currently downloading a different portion of the complete single data file as a partial file during the single given data file download session;
using the first information handling system to calculate a first hash value of each given one of the currently downloaded partial files as received at the first information handling system;
receiving a second hash value of each given one of the currently downloaded partial files at the first information handling system from the second information handling system, the second hash value being calculated on the second information handling system before transmittal to the first information handling system;
then comparing the first hash value to the second hash value of each given currently downloaded partial file on the first information handling system to determine if the first hash value is the same as the second hash value for the given currently downloaded partial file; and
then only one of:
appending the given currently downloaded partial file to other currently downloaded partial files of the same complete single data file stored on non-volatile storage of the first information handling system only if the first hash value is the same as the second hash value for the given currently downloaded partial file, or
deleting the given currently downloaded partial file without appending the given currently downloaded partial file to other downloaded partial files of the same complete single data file only if the first hash value is not the same as the second hash value for the given currently downloaded partial file, and requesting a download of a new copy of the data of the given currently downloaded partial file from the second information handling system.

10. The method of claim 9, further comprising storing each of the currently downloaded partial files and first hash values on non-volatile storage of the first information handling system prior to comparing the first hash value to the second hash value of each given currently downloaded partial file on the first information handling system.

11. The method of claim 9, further comprising determining whether the given currently downloaded partial file is the next sequential partial file to be appended to the other currently downloaded partial files of the same complete single data file; and only one of:
appending the given currently downloaded partial file to other currently downloaded partial files of the same complete single data file if the given currently downloaded partial file is determined to be the next sequential partial file of the same complete single data file, or
storing the given currently downloaded partial file on system storage of the first information handling system without appending the given currently downloaded partial file to other currently downloaded partial files of the same single data file if the given currently downloaded partial file is determined not to be the next sequential partial file of the same complete single data file.

12. The method of claim 11, further comprising later appending the previously-stored and non-appended given currently downloaded partial file from the system storage of the first information handling system to the other currently downloaded partial files of the same complete single data file when it is later determined that the previously-stored given currently downloaded partial file is now the next sequential partial file of the same complete single data file being assembled on the first information handling system.

13. The method of claim 10, further comprising:
simultaneous downloading a first group of separate and different partial files of the complete single data file and storing each of the first group of separate and different partial files of the complete single data file on non-volatile storage of the first information handling system;
then ceasing the simultaneously downloading of the first group of separate and different partial files of the complete single data file before all partial files of the complete single data file are downloaded to the first information handling system upon loss of communication across the network between the first information handling system and the second information handling system due to at least one of a system shutdown or rebooting of the first information handling system, a system shutdown or rebooting of the second information handling system, an outage of the network, or disconnection of a network connection between the network and at least one of the first information handling system or second information handling system;

then upon regaining the communication across the network between the first information handling system and the second information handling system, resuming the simultaneous downloading of a second group of separate and different partial files of the complete single data file that only includes partial files of the complete single data file that were not been previously downloaded in the first group of separate and different partial files; and appending the partial files of the second group of partial data files to the partial files of the first group of partial data files in a proper sequence relative to each other to complete the single data file on the non-volatile storage of the first information handling system.

14. The method of claim 9, further comprising assembling the separately downloaded portions of the complete single data file in a proper sequence relative to each other to complete the single data file on non-volatile storage of the first information handling system.

15. A system, comprising at least one programmable integrated circuit of a first information handling system coupled to at least one non-volatile storage of the first information handling system, the programmable integrated circuit being programmed to use a single first data file download session to simultaneously download all separate and different portions of a first complete single data file in multiple separate simultaneous connections across a network to the first information handling system from a second information handling system with each of the simultaneous connections downloading a different portion of the first complete single data file during the first data file download session; and to at least one of:

adjust a number of the multiple simultaneous connections during the first data file download session by increasing and decreasing the number of multiple simultaneous connections that are simultaneously downloading the separate and different portions of the first complete single data file at the first information handling system from the second information handling system, and to assemble the separately downloaded portions of the first complete single data file into the first complete single data file on the non-volatile storage of the first information handling system; or calculate a first hash value of each given one of the partial files as they are currently downloaded and received at the first information handling system, receive a second hash value of each given one of the currently downloaded partial files at the first information handling system from the second information handling system, the second hash value being calculated on the second information handling system before transmittal to the first information handling system, then compare the first hash value to the second hash value of each given currently downloaded partial file on the first information handling system to determine if the first hash value is the same as the second hash value for the given downloaded partial file, and then only one of:

append the given currently downloaded partial file to other currently downloaded partial files of the same first complete single data file stored on non-volatile storage of the first information handling system if the first hash value is the same as the second hash value for the given currently downloaded partial file, or delete the given currently downloaded partial file without appending the given currently downloaded partial file to other currently downloaded partial files of the same first complete single data file if the first hash value is not the same as the second hash value for the given currently downloaded partial file, and request a download of a new copy of the data of the given currently downloaded partial file from the second information handling system.

16. The system of claim 15, where the programmable integrated circuit of the first information handling system is further programmed to:

calculate a first hash value of each given one of the currently downloaded partial files as received at the first information handling system, receive a second hash value of each given one of the currently downloaded partial files at the first information handling system from the second information handling system, the second hash value being calculated on the second information handling system before transmittal to the first information handling system, then compare the first hash value to the second hash value of each given currently downloaded partial file on the first information handling system to determine if the first hash value is the same as the second hash value for the given currently downloaded partial file;

store each of the currently downloaded partial files and first hash values on the non-volatile storage of the first information handling system prior to comparing the first hash value to the second hash value of each given currently downloaded partial file on the first information handling system;

determine whether the given currently downloaded partial file is the next sequential partial file to be appended to the other downloaded partial files of the same first complete single data file; and then only one of:

append the given currently downloaded partial file to other currently downloaded partial files of the same first complete single data file if the given currently downloaded partial file is determined to be the next sequential partial file of the same first complete single data file, or store the given currently downloaded partial file on system storage of the first information handling system without appending the given currently downloaded partial file to other downloaded partial files of the same first complete single data file if the given currently downloaded partial file is determined not to be the next sequential partial file of the same first complete single data file.

17. The system of claim 16, where the at least one programmable integrated circuit of the first information handling system is further programmed to later append the previously-stored and non-appended given currently downloaded partial file from the system storage of the first information handling system to the other currently downloaded partial files of the same first complete single data file when it is later determined that the previously-stored given currently downloaded partial file is now the next sequential partial file of the same first complete single data file being assembled on the first information handling system.

18. The system of claim 15, where the at least one of the programmable integrated circuit of the first information handling system is further programmed to:

start the simultaneous downloading of the separate and different portions of the first complete single data file using a predetermined minimum number of one or more separate simultaneous connections across the network to the first information handling system from the second information handling system;

then iteratively increase the number of multiple simultaneous connections employed to download the separate and different portions of the first complete single data file, and determine a total data download speed achieved across the multiple simultaneous connections for each of the iterations of increased number of multiple simultaneous connections;

then cease the iterative increasing of the number of multiple simultaneous connections employed during the download of the separate and different portions of the first complete single data file when it is determined that increasing the number of multiple simultaneous connections does not result in an increase in the determined total data download speed achieved across the multiple simultaneous connections for a predetermined number of one or more iterations; and then iteratively decrease the number of multiple simultaneous connections employed to download the separate and different portions of the first complete single data file, and determine a total data download speed achieved across the multiple simultaneous connections for each of the iterations of decreased number of multiple simultaneous connections; and then cease the iterative decreasing of the number of multiple simultaneous connections employed during the download of the separate and different portions of the first complete single data file when it is determined that decreasing the number of multiple simultaneous connections results in a decrease in the determined total data download speed achieved across the multiple simultaneous connections for a predetermined number of one or more iterations.

19. The system of claim 15, where the at least one of the programmable integrated circuit of the first information handling system is further programmed to:

iteratively decrease the number of multiple simultaneous connections employed to download the separate and different portions of the first complete single data file, and determine a total data download speed achieved across the multiple simultaneous connections for each of the iterations of decreased number of multiple simultaneous connections; and then cease the iterative decreasing of the number of multiple simultaneous connections employed during the download of the separate and different portions of the first complete single data file when it is determined that decreasing the number of multiple simultaneous connections results in a decrease in the determined total data download speed achieved across the multiple simultaneous connections for a predetermined number of one or more iterations.

20. The system of claim 15, where the at least one of the programmable integrated circuit of the first information handling system is further programmed to:

determine data download conditions on the first information handling system during the duration of the download of the separate and different portions of the first complete single data file;

then transmit the determined data download conditions as telemetry from the first information handling system to the second information handling system;

then determine initial data download settings from the determined data download conditions for use with future downloads of separate and different portions of a second and different complete single data file in multiple separate simultaneous connections of a second and different data file download session from the second information handling system to the first information handling system across the network;

then store the determined initial data download settings on the non-volatile storage of the second information handling system; and then use at least a portion of the determined initial data download settings to begin simultaneously downloading all separate and different portions of the second complete single data file in multiple separate simultaneous connections of the second data file download session across the network to the first information handling system from the second information handling system, each of the simultaneous connections downloading a different portion of the second complete single data file.

21. The system of claim 15, where the determined data download conditions comprise at least one of a maximum single file download speed obtained during a previous and different data file download session, or a number of simultaneous connections that were previously employed to result in a highest total data download speed during a previous and different data file download session.

22. The system of claim 15, where the determined data download conditions comprise at least one of an identity of a region or country for the first information handling system, or an identity of an Internet service provider (ISP) for the first information handling system.

23. The method of claim 6, where the telemetry transmitted from the first information handling system to the second information handling system comprises at least one of a maximum single file download speed obtained during a previous and different data file download session, or a number of simultaneous connections that were previously employed to result in a highest total data download speed during a previous and different data file download session.

24. The method of claim 6, where the telemetry transmitted from the first information handling system to the second information handling system comprises at least one of an identity of a region or country for the first information handling system, or an identity of an Internet service provider (ISP) for the first information handling system.

* * * * *